(12) United States Patent
Liu et al.

(10) Patent No.: US 11,630,804 B1
(45) Date of Patent: Apr. 18, 2023

(54) CLASSIFYING AND STORING MULTIPLE LAYERS OF A FILE SYSTEM

(71) Applicant: International Business Machines Corporation, Armonk, NY (US)

(72) Inventors: Hou Gang Liu, Xi'an (CN); Guang Ya Liu, Xi'an (CN); Jin Chi J C He, Xi'an (CN); Yu Xing Y X Ren, Xi'an (CN); Dong Yu, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 17/488,358

(22) Filed: Sep. 29, 2021

(51) Int. Cl.
*G06F 16/16* (2019.01)
*G06F 16/18* (2019.01)
*G06F 16/182* (2019.01)

(52) U.S. Cl.
CPC ............ *G06F 16/16* (2019.01); *G06F 16/183* (2019.01)

(58) Field of Classification Search
CPC ....... G06F 16/16; G06F 16/183; G06F 16/188
See application file for complete search history.

(56) References Cited

U.S. PATENT DOCUMENTS

| | | | | |
|---|---|---|---|---|
| 8,010,961 B1 * | 8/2011 | Cook | .................. | G06F 9/455 713/165 |
| 2014/0325616 A1 * | 10/2014 | Dolph | .................. | H04L 63/08 726/5 |
| 2017/0255462 A1 * | 9/2017 | Azagury | .................. | G06F 9/30145 |
| 2018/0113705 A1 * | 4/2018 | Webb | .................. | G06F 8/76 |
| 2018/0173524 A1 | 6/2018 | Azagury | | |
| 2019/0303120 A1 * | 10/2019 | Bhat | .................. | G06F 8/63 |
| 2020/0142680 A1 * | 5/2020 | Varadharajan Kannan | .................. | G06F 8/63 |
| 2022/0012065 A1 * | 1/2022 | Liu | .................. | H04L 67/34 |

FOREIGN PATENT DOCUMENTS

| | | |
|---|---|---|
| CN | 112333003 A | 2/2021 |
| JP | 6791323 B1 | 11/2020 |

OTHER PUBLICATIONS

Mell et al., "The NIST Definition of Cloud Computing", National Institute of Standards and Technology, Special Publication 800-145, Sep. 2011, 7 pages.

* cited by examiner

*Primary Examiner* — Hares Jami
(74) *Attorney, Agent, or Firm* — Stephen R. Yoder

(57) ABSTRACT

In an approach for classifying and storing multiple layers of a file system as platform-dependent and platform-independent layers, a processor generates an initial layer of a file system. The initial layer is a platform-dependent base layer. A processor assigns one or more files associated with the initial layer with a first group identification as a first same group in a file registry for a plurality of platforms. A processor generates a new layer based on the initial layer into the file system. A processor, in response to the new layer being platform-independent, marks the new layer as platform-independent in the file registry. A processor pushes the new layer into the file registry for one of the plurality of platforms. A processor distributes one or more corresponding files from the file registry per a client request to access the file system.

20 Claims, 10 Drawing Sheets

CLASSIFYING AND STORING MULTIPLE LAYERS OF A FILE SYSTEM

BACKGROUND

The present disclosure relates generally to the field of file systems, and more particularly to classifying and storing multiple layers of a file system as platform-dependent and platform-independent layers.

A platform can refer to a type of processor or other hardware on which an operating system or application runs. Applications can be written to depend on the features of a particular platform—either the hardware, operating system, or virtual machine. In computing, cross-platform software may be computer software that is designed to work in several computing platforms. Some cross-platform software requires a separate build for each platform, but some can be directly run on any platform without special preparation, being written in an interpreted language or compiled to portable bytecode for which the interpreters or run-time packages are common or standard components of all supported platforms.

SUMMARY

Aspects of an embodiment of the present disclosure disclose an approach for classifying and storing multiple layers of a file system as platform-dependent and platform-independent layers. A processor generates an initial layer of a file system. The initial layer is a platform-dependent base layer. A processor assigns one or more files associated with the initial layer with a first group identification as a first same group in a file registry for a plurality of platforms. A processor generates a new layer based on the initial layer into the file system. A processor, in response to the new layer being platform-independent, marks the new layer as platform-independent in the file registry. A processor pushes the new layer into the file registry for one of the plurality of platforms. A processor distributes one or more corresponding files from the file registry per a client request to access the file system.

DETAILED DESCRIPTION

Figure 1:
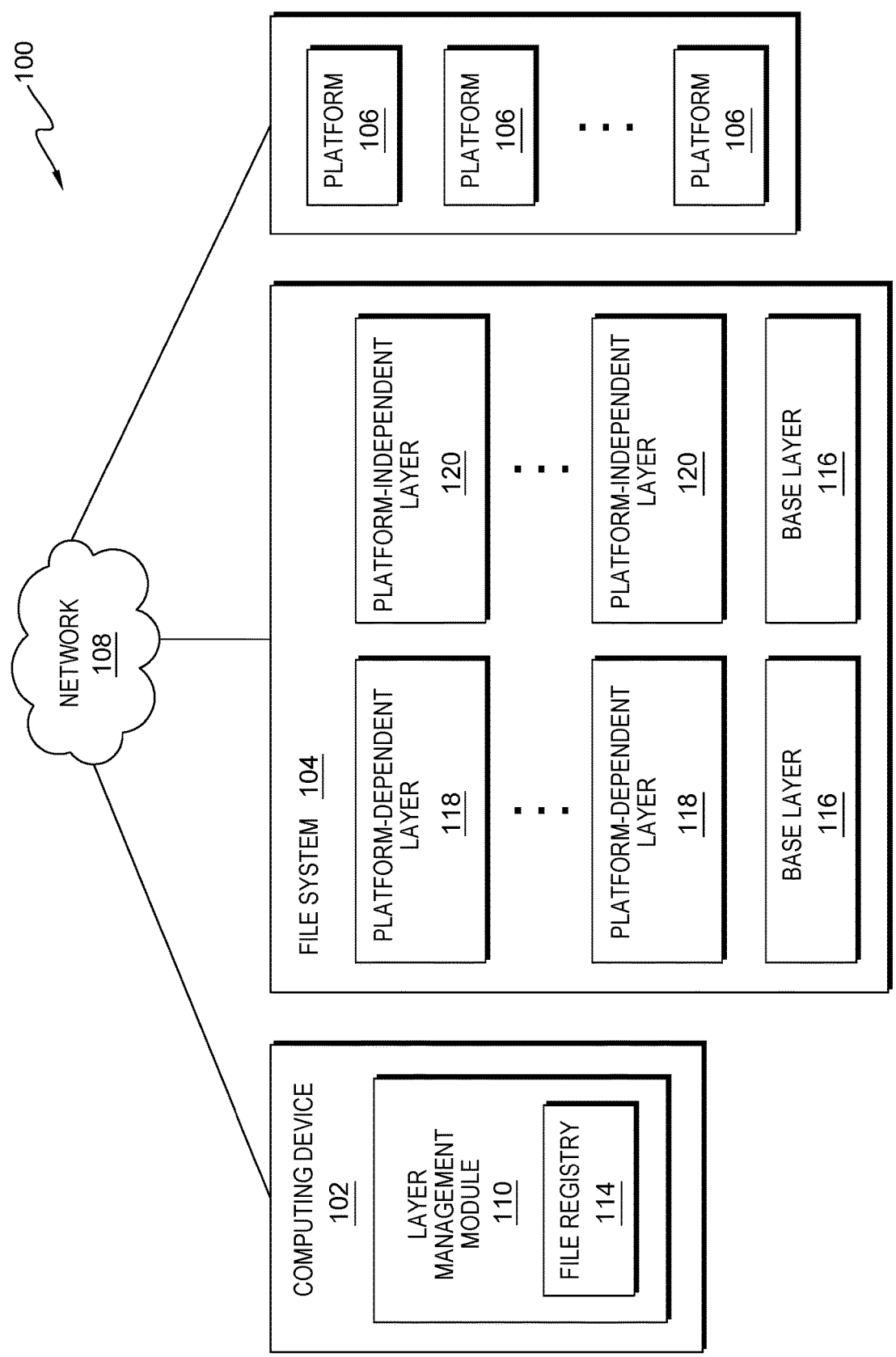
FIG. 1 is a functional block diagram illustrating a file layer classification and storage environment, in accordance with an embodiment of the present disclosure.

The present disclosure is directed to systems and methods for classifying and storing multiple layers of a file system as platform-dependent and platform-independent layers.

Embodiments of the present disclosure recognize a need for sharing platform-independent layers in cross-platforms and saving time and space. Embodiments of the present disclosure recognize a need for a solution to make platform-independent layers shared by multi-architecture files. Embodiments of the present disclosure disclose methods and systems for classifying and storing multiple layers of a file system as platform-dependent and platform-independent layers. Embodiments of the present disclosure disclose generating a multiple-layer file that includes platform-independent layers and platform-dependent layers for sharing onto a container image. Embodiments of the present disclosure disclose enabling a file registry to record all counterparts for multiple platforms of platform-independent and platform-dependent in a form of a group, wherein a file layer in the registry is composed of a platform-dependent/independent layer identification and a group layer identification. Embodiments of the present disclosure disclose enabling the file registry to distribute an appropriate layer to a client (e.g., a container image) based on client information (e.g., operating system, platform and so on) for a platform-dependent or independent layer.

Embodiments of the present disclosure disclose introducing a platform-independent file layer and a file registry that can record all the counterparts for multiple platforms of a same platform-dependent layer or a same file in the form of group. A multiple-layers file may include platform-independent layers and platform-dependent layers. Platform-dependent layers of a file in a file registry may be recorded with a group identification. The file registry may distribute an appropriate layer to a client based on client information (e.g., operating system, platform and so on). When a user adds a new platform-independent layer, the use may only need to build a new layer on a platform base file. After pushing the new file into the registry, the new file can also work well on other platforms automatically.

Embodiments of the present disclosure disclose a method that enables an image on multi-architecture platforms to share platform-independent layer files. Embodiments of the present disclosure disclose introducing a platform-independent file layer and a file registry that can record all the counterparts for multiple platforms of a same platform-dependent layer or same file in the form of a group. Embodiments of the present disclosure disclose a method that enables storing a platform-independent layer and sharing the platform-independent layer in a storage. Embodiments of the present disclosure disclose classifying layers of a file system as platform-dependent and platform-independent so that a multiple-layer file may be composed of platform-independent layers and platform-dependent layers. Embodiments of the present disclosure disclose a file registry that records all the counterparts for multiple platforms of a same platform-dependent layer or a same file in a form of a group. In the file registry, a file may include a platform-independent layer identification and a group layer identification. Embodiments of the present disclosure disclose distributing a layer to a client based on client information, e.g., for a platform-dependent layer, just to distribute the platform-dependent layer; for a group, to distribute a corresponding layer in the group to the client.

Aspects of the present disclosure relate to classifying and storing multiple layers of a file system as platform-dependent and platform-independent layers including computer programs and files within "container images" used by software "containers". Container images include software components, which may be organized as layers and images, for execution on a computer and utilizing an underlying operating system or operating system kernel. A software "container" (hereinafter, "container") is a form of computer virtualization, which isolates execution of one or more programs (and files or file systems) with regard to other programs and resources of a computer. A container is an executable (e.g., "run-time") entity that may reference one or more container "images" and may establish a context for running a program or set of programs using, or included as, components of a container image. A Linux container is an example of a software container, as are other software container technologies such as "FreeBSD jails", or containers implemented for operating system types other than Linux.

A container may include, may describe (e.g., identify or establish amounts of), or may allocate or activate processes or resources of a computing system. The processes and resources may be used to run programs interacting with or included in a container image. A process is a runtime entity that interacts with a host operating system to execute programs within the operating system environment. A container may interact with a host operating system to allocate one or more processes. A container may activate one or more processes to execute programs interacting with, or included in a container image. A container may include resources of a computing system (or a computer) or may request an operating system to allocate particular resources of a computer system. The container, or a hosting operating system, may allocate the resources to processes included in, described by, or activated by a container. The resources may include CPUs, memory, storage, and network resources. For example, CPUs may include processors chips, cores, or threads, and a container may include the identity and an amount (number or fraction of) particular CPUs. Memory may include, for example, main memory, flash memory, or cache memory of a computer. Storage may, for example, include disk or solid-state storage, and may include the location or identity of particular storage media. Network resources may include, for example, network addresses (e.g., an IP address) or virtual or physical network interfaces (e.g., an Ethernet port).

An image may include program or data files, which may be, or include, files required for the container to execute. The programs or files contained, or referenced, in an image may be included in a file system (e.g., a set of files and a directory structure organizing the files), or a portion thereof. One or more file systems (or, portion thereof) may be included in an image, or may be referenced by programs or files within an image. A file system included in or referenced by components of an image may be the entirety, or a portion of a host (e.g., an underlying operating system) file system. A container image may be a single image, or may aggregate a plurality of images within it. For example, a set of images within a container image may be organized in a variety of manners, such as nested within each other, stacked upon each other, or linked in some manner (e.g., using a linked-list). For purposes of illustrating the disclosure, and hereinafter, "container image" refers to a single container image, or an aggregation of images forming a container image. Programs external to a container image (e.g., an operating system) may view, or treat, a container image as a file. An image file may be in a particular format; for example, an image file may be formatted in a tape archive format.

A container image may be, or may include, a file that includes, or references, one or more other component images. Images, or components of one or more images, within a container image may be embedded within the container image (e.g., as one or more image files within a larger image file) or may be referenced by a container image, or a file describing a container image. Executing, or "running", a container may entail executing (running) programs within the image(s), or programs referencing components of the image(s), of the container on a computer. Executing a container may also include interacting with the programs included in the container image (e.g., via an operating system command line or graphical user interface, or by means of other programs). Hereinafter, "executing", or "running", a container is understood to mean executing programs within, or referenced by, a container image, as well as interacting (e.g., by a user or another program) with the components (e.g., programs, files, or file systems) of the container image.

Programs within a particular container image may be "platform independent" and, correspondingly, suitable for execution on any particular computer, without specific accommodation for the instruction set architecture (e.g., Intel® 386, Sun SPARC, IBM POWER, ARM A7, etc.) of that computer. Programs written in translated or interpreted languages—such as JAVA®, bytecode, Python, or other scripting languages—are examples of programs that may be platform independent. However, such program may execute within an underlying "run time environment" (e.g., a library of programs used during execution of the program) and the run time environment may be generated (e.g., assembled or compiled) to execute on a computer having a particular instruction set architecture.

Components of an image may be encapsulated within "layers" within an image. A layer may encapsulate a particular function or service of a computing system, such as host operating system functions (e.g., networking or authority management), web hosting, storage management, or other such services or functions. Layers of a container may be hierarchical, such as forming a "stack", and one layer may be defined with reference to one or more layers below (i.e., "underlying") that layer in the stack. Components of one layer may replace, or may augment, components of a lower layer. A layer may include, or be associated with, meta-data that describes the components of the layer. The meta-data may describe the components with references to one or more lower layers within a container. For example, the meta-data may include a "change-set" that lists, or otherwise describes, files added to, removed from, or replacing files in an underlying layer. The meta-data may also include properties of the layer, such as the number of files or other indications of the size of a layer, its components, or where the layer (or, a component of the layer) starts or ends within a container.

An image may also include, or be associated with, meta-data describing the image itself, or describing components (e.g., layers) of the image. For example, an image may include a header describing a layer within the image, such as the name of the layer and the location of that layer within the image. Meta-data for an image may indicate the relationships of the layers within the image, such as which layer precedes another layer, from the bottom to the top of a hierarchical stack of layers within the image. Meta-data may include information describing an image, or components (e.g., layers, or the contents of layers) of an image, directly. Alternatively, an image file may be associated with another file, external to (i.e., not included within) a container image, and that external file may describe the container image, or images or layers (or, the contents of the layers) and their relationships, within the image(s). Data describing, or included within an image may include, for each layer within the image, a change-set describing that layer and the change-set may describe a layer with references to files, or file systems, included in one or more underlying layers. An image may be generated with reference to a change-set associated with a lower, underlying layer. An image may include one or more "scripts" (e.g., a set of operating system or file system commands) written in an interpreted, or script, language (e.g., PHP or Python). An image may further include an interpreter (e.g., Java®, PHP, or Python) or may include a script language or interpreter runtime library (e.g., Java®, PHP, or Python runtime libraries) to execute a script included in, or invoked, when the container is run.

The present disclosure will now be described in detail with reference to the Figures. FIG. 1 is a functional block diagram illustrating file layer classification and storage environment, generally designated 100, in accordance with an embodiment of the present disclosure.

In the depicted embodiment, file layer classification and storage environment 100 includes computing device 102, file system 104, platform(s) 106, and network 108. In various embodiments of the present disclosure, platform(s) 106 can be an environment in which computer programs (e.g., in file system 104) may be executed. Platform(s) 106 may be a hardware, an operating system, a web browser and associated application programming interfaces, or any other underlying software, as long as computer programs may be executed with platform(s) 106. Platform(s) 106 may have different abstraction levels, including a computer architecture, an operating system, or runtime libraries. Platform(s) 106 may be a stage on which computer programs can run. For example, platform(s) 106 may be Intel® 386, Sun SPARC, IBM POWER, ARM A7, etc. File system 104 may include base layer(s) 116, platform-dependent layer(s) 118 and platform-independent layer(s) 120. For example, computer programs within file system 104 may be "platform independent" and, correspondingly, suitable for execution on any particular computer, without specific accommodation for the instruction set architecture (e.g., Intel® 386, Sun SPARC, IBM POWER, ARM A7, etc.) of that computer. Computer programs written in translated or interpreted languages—such as bytecode, Python, or other scripting languages—are examples of programs that may be platform independent. However, such program may execute within an underlying "run time environment" (e.g., a library of programs used during execution of the program) and the run time environment may be generated (e.g., assembled or compiled) to execute on a computer having a particular instruction set architecture. In an example, base layer(s) 116 can be platform-dependent layers.

In an example, file system 104 may be a container. A container may be described as a virtual environment providing portability to a set of encapsulated applications. Docker® (offered by Docker Inc, San Francisco, Calif., U.S.A.), and Windows Containers (offered by Microsoft Corp., Redmond, Wash., U.S.A.) are two examples of container-based virtualization offerings. A container may be instantiated from a container image by a container engine or host that provides a runtime environment for the image. Much like a virtual machine, a container may be stopped/paused and started when needed, though containers are generally lighter-weight than virtual machines. Such containerization platforms may help simplify environment standardization, so that the deployment of applications may be instant. Docker (or similar platform) may use a feature known as an overlay file system to implement a copy-on-write process that stores any updated information to a root file system of a container, compared to the original image on which it is based. Each container may be an image with a readable/writeable layer on top of many read-only layers. These layers (also called intermediate images) may be generated when the commands in the Docker file are executed during the Docker image build.

In an example, file system 104 may be a Docker file system. The present disclosure may be similarly applied to non-Docker file systems or other types of container platforms that may have similar operations (e.g., Google® Kubernetes, Windows® Containers). As such, the use of Docker should be taken as example only and not to otherwise limit the scope of the disclosure.

Components of an image may be encapsulated within "layers" within an image. A layer may encapsulate a particular function or service of a computing system, such as host operating system functions (e.g., networking or authority management), web hosting, storage management, or other such services or functions. Layers of a container may be hierarchical, such as forming a "stack", and one layer may be defined with reference to one or more layers below (i.e., "underlying") that layer in the stack. Components of one layer may replace, or may augment, components of a lower layer. A layer may include, or be associated with, meta-data that describes the components of the layer. The meta-data may describe the components with references to one or more lower layers within a container. For example, the meta-data may include a "change-set" that lists, or otherwise describes, files added to, removed from, or replacing files in an underlying layer. The meta-data may also include properties of the layer, such as the number of files or other indications of the size of a layer, its components, or where the layer (or, a component of the layer) starts or ends within a container.

An image may also include, or be associated with, meta-data describing the image itself, or describing components (e.g., layers) of the image. For example, an image may include a header describing a layer within the image, such as the name of the layer and the location of that layer within the image. Meta-data for an image may indicate the relationships of the layers within the image, such as which layer precedes another layer, from the bottom to the top of a hierarchical stack of layers within the image. Meta-data may include information describing an image, or components (e.g., layers, or the contents of layers) of an image, directly. Alternatively, an image file may be associated with another file, external to (i.e., not included within) a container image, and that external file may describe the container image, or images or layers (or, the contents of the layers) and their relationships, within the image(s). Data describing, or included within an image may include, for each layer within the image, a change-set describing that layer and the change-set may describe a layer with references to files, or file systems, included in one or more underlying layers. An image may be generated with reference to a change-set associated with a lower, underlying layer. An image may include one or more "scripts" (e.g., a set of operating system or file system commands) written in an interpreted, or script, language (e.g., PHP or Python). An image may further include an interpreter (e.g., Java®, PHP, or Python) or may include a script language or interpreter runtime library (e.g., Java®, PHP, or Python runtime libraries) to execute a script included in, or invoked, when the container is run.

Layers of a container may be hierarchical, such as forming a "stack", and one layer may be defined with reference to one or more layers below (i.e., "underlying") that layer in the stack. Components of one layer may replace, or may augment, components of a lower layer.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to layer classification module 110 and network 108 and is capable of processing program instructions and executing layer classification module 110, in accordance with an embodiment of the present disclosure. Computing device 102 may include internal and external hardware components, as depicted and described in further detail with respect to FIG. 8.

Further, in the depicted embodiment, computing device 102 includes layer management module 110. In the depicted embodiment, layer management module 110 is located on computing device 102. However, in other embodiments, layer management module 110 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and layer management module 110, in accordance with a desired embodiment of the disclosure. In some embodiments, layer management module 110 may be located on file system 104. In the depicted embodiment, layer management module 110 includes file registry 114. In the depicted embodiment file registry 114 is located on computing device 102 and layer management module 110. However, in other embodiments, file registry 114 may be located externally and accessed through a communication network such as network 108. In some embodiments, file registry 114 may be located on file system 104.

In one or more embodiments, layer management module 110 is configured to generate an initial layer of file system 104. The initial layer may be a platform-dependent base layer, for example, base layer 116, for a plurality of platforms 106. In an example, base layer 116 can include an operating system which is a platform-dependent file. For example, the operating system can be a Linux system or any other applicable operating systems. The operating system may include a set of compiler and toolchain files, e.g., LLVM (low level virtual machine) compiler and toolkit for building compilers. LLVM can be used to develop a front end for any programming language and a back end for any instruction set architecture. The operating system and the associated files can be platform-dependent, e.g., different for x86-64, Power ISA, ARM64, and IBM Z and a desktop version for x86-64. Layer management module 110 may generate base layer 116 for each platform 106. Layer management module 110 may push each base layer 116 into file registry 114. Layer management module 110 may group base layer(s) 116 as a group with a same group identification in file registry 114.

In one or more embodiments, layer management module 110 is configured to assign files associated with the initial layer with a group identification as a same group in file registry 114 for a plurality of platforms 106. Layer management module 110 may enable file registry 114 to record all counterparts of the initial layer for the plurality of platforms 106 of platform-independent and platform-dependent layers in the form of a group. Each platform-independent or platform-dependent layer in file registry 114 may include a platform-dependent/independent layer identification and a group layer identification. File registry 114 can record all the counterparts for multiple platforms 106 of a same platform-dependent layer or same file in the form of a group. Layer management module 110 may push all these initial lowest layer files into file registry 114 and may then group the files as a same tag (which information is maintained in file registry 114). For example, a group named redhat7.4-llvm8.0.0 may group files of redhat 7.4 and llvm8.0.0 for x86-64, ppc641e, arm64 and so on. When a client pulls redhat 7.4+llvm8.0.0 file, file registry 114 may distribute the corresponding files dependent on platforms 106 based on client request information (e.g., operating systems, platforms and so on). Layer management module 110 may group multiple layers for multiple platforms 106 in file registry 114 together. In the group, layer management module 110 may mark the corresponding information (e.g., operating system, platform) in metadata of the corresponding layer.

In one or more embodiments, layer management module 110 is configured to generate a new layer based on base layer 116 into file system 104. Layer management module 110 may determine whether the new layer is platform-dependent or platform-independent. If the new layer is platform-dependent, layer management module 110 may generate a corresponding layer, based on the new layer, for each of the plurality of platforms 106. Layer management module 110 may group each corresponding layer with a group identification as a same group. Layer management module 110 may push the corresponding layers into file registry 114. Layer management module 110 may group the layers with a same tag which information is maintained in file registry 114. If the new layer is platform-independent, layer management module 110 may need to generate only one layer for all platforms 106. Layer management module 110 may only need to push the new layer into one of platforms 106. Layer management module 110 may just record and mark the new layer as platform-independent. Layer management module 110 may classify and store multiple layers of file system 104 as platform-dependent and platform-independent. When a new platform-independent layer is added in file system 104, layer management module 110 may build the new file on one platform base file. After layer management module 110 pushes the new file into file registry 114, the new file can also work well on other platforms automatically. Layer management module 110 may share multiple platform-independent layers and platform-dependent layers onto a container image. Layer management module 110 may group multiple layers and files for multiple platforms 106 in file registry 114. Layer management module 110 may mark corresponding operating systems and platform information in metadata of the corresponding layer. Layer management module 110 may analyze a multi-layer file pushed into file registry 114 and may generate a layer layout for the multi-layer file in file registry 114.

In one or more embodiments, layer management module 110 is configured to mark a new layer as being platform-independent in file registry 114 in response that the new layer is platform-independent. If the new layer is platform-independent, layer management module 110 may need to generate only one layer for all platforms 106. Layer management module 110 may push the new layer into file registry 114 for one of platforms 106. Layer management module 110 may only need to push the new layer onto one of platforms 106. Layer management module 110 may just record the layer as platform-independent. When a multi-layer file is pushed into file registry 114, file registry 114 may analyze the file and generate the layer layout information which is recorded in file registry 114.

In one or more embodiments, layer management module 110 is configured to distribute one or more corresponding files through file registry 114 per a client request to access file system 104. The client request may include client information, e.g., operating system, platform, and other related information. The one or more corresponding files may include container images. File registry 114 may be responsible to distribute an appropriate layer to a client based on client information (e.g., operating system, platform and so on). A multiple-layers file may include both platform-independent layers and platform-dependent layers. Layer management module 110 may enable file registry 114 to distribute an appropriate layer to a client (e.g., a container image) based on client information (e.g., operating system, platform) for a platform-dependent or independent layer. When a user sends a file request, file registry 114 may distribute a corresponding layer to the user. For example, if the new generated layers of a multiple layer file are platform-independent, layer management module 110 only needs to build once for one platform 106 and the file can work well for multiple platforms 106 automatically. Time and space can be saved as platform-independent layers are shared.

Figure 2:
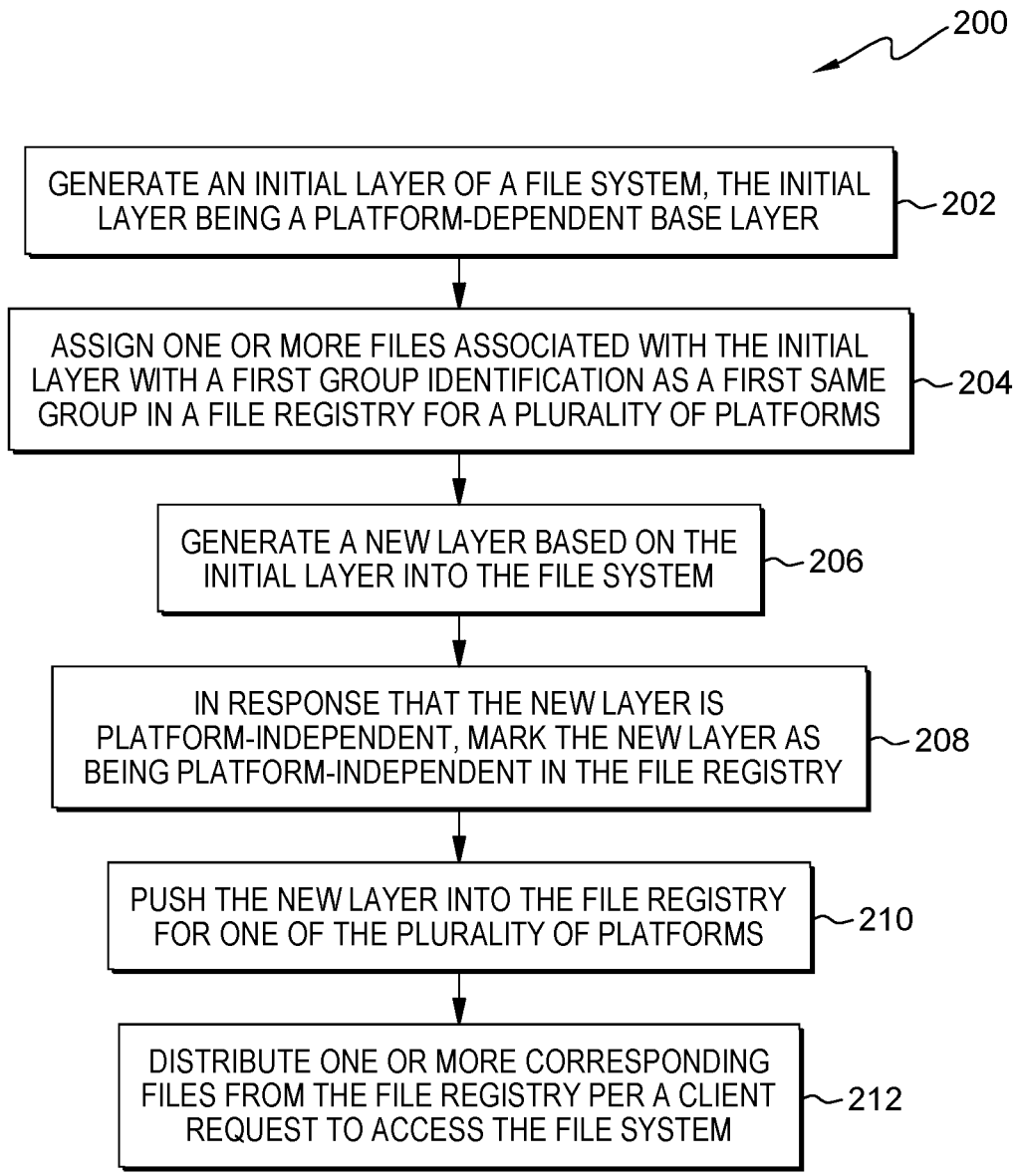
FIG. 2 is a flowchart depicting operational steps of a layer management module within a computing device of FIG. 1, in accordance with an embodiment of the present disclosure.

FIG. 2 is a flowchart 200 depicting operational steps of layer management module 110 in accordance with an embodiment of the present disclosure.

Layer management module 110 operates to generate an initial layer of file system 104. The initial layer may be a platform-dependent base layer. Layer management module 110 also operates to assign files associated with the initial layer with a group identification as a same group in file registry 114 for a plurality of platforms 106. Layer management module 110 operates to generate a new layer based on base layer 116 into file system 104. Layer management module 110 operates to mark a new layer as being platform-independent in file registry 114 in response that the new layer is platform-independent. Layer management module 110 operates to push the new layer into file registry 114 for one of platforms 106. Layer management module 110 operates to distribute one or more corresponding files through file registry 114 per a client request to access file system 104.

In step 202, layer management module 110 generates an initial layer of file system 104. The initial layer may be a platform-dependent base layer, for example, base layer 116, for a plurality of platforms 106. In an example, base layer 116 can include an operating system which is a platform-dependent file. For example, the operating system can be a Linux system or any other applicable operating systems. The operating system may include a set of compiler and toolchain files, e.g., LLVM (low level virtual machine) compiler and toolkit for building compilers. LLVM can be used to develop a front end for any programming language and a back end for any instruction set architecture. The operating system and the associated files can be platform-dependent, e.g., different for x86-64, Power ISA, ARM64, and IBM Z and a desktop version for x86-64. Layer management module 110 may generate base layer 116 for each platform 106. Layer management module 110 may push each base layer 116 into file registry 114. Layer management module 110 may group base layer(s) 116 as a group with a same group identification in file registry 114.

In step 204, layer management module 110 assigns files associated with the initial layer with a group identification as a same group in file registry 114 for a plurality of platforms 106. Layer management module 110 may enable file registry 114 to record all counterparts of the initial layer for the plurality of platforms 106 of platform-independent and platform-dependent layers in the form of a group. Each platform-independent or platform-dependent layer in file registry 114 may include a platform-dependent/independent layer identification and a group layer identification. File registry 114 can record all the counterparts for multiple platforms 106 of a same platform-dependent layer or same file in the form of a group. Layer management module 110 may push all these initial lowest layer files into file registry 114 and may then group the files as a same tag (which information is maintained in file registry 114). For example, a group named redhat7.4-llvm8.0.0 may group files of redhat 7.4 and llvm8.0.0 for x86-64, ppc641e, arm64 and so on. When a client pulls redhat 7.4+llvm8.0.0 file, file registry 114 may distribute the corresponding files dependent on platforms 106 based on client request information (e.g., operating systems, platforms and so on). Layer management module 110 may group multiple layers for multiple platforms 106 in file registry 114 together. In the group, layer management module 110 may mark the corresponding information (e.g., operating system, platform) in metadata of the corresponding layer.

In step 206, layer management module 110 generates a new layer based on base layer 116 into file system 104. Layer management module 110 may determine whether the new layer is platform-dependent or platform-independent. If the new layer is platform-dependent, layer management module 110 may generate a corresponding layer, based on the new layer, for each of the plurality of platforms 106. Layer management module 110 may group each corresponding layer with a group identification as a same group. Layer management module 110 may push the corresponding layers into file registry 114. Layer management module 110 may group the layers as a same tag which information is maintained in file registry 114. If the new layer is platform-independent, layer management module 110 may need to generate only one layer for all platforms 106. Layer management module 110 may only need to push the new layer into one of platforms 106. Layer management module 110 may just record and mark the new layer as platform-independent. Layer management module 110 may classify and store multiple layers of file system 104 as platform-dependent and platform-independent. When a new platform-independent layer is added in file system 104, layer management module 110 may build the new file on one platform base file. After layer management module 110 pushes the new file into file registry 114, the new file can also work well on other platforms automatically. Layer management module 110 may share multiple platform-independent layers and platform-dependent layers onto a container image. Layer management module 110 may group multiple layers and files for multiple platforms 106 in file registry 114. Layer management module 110 may mark corresponding operating systems and platform information in metadata of the corresponding layer. Layer management module 110 may analyze a multi-layer file pushed into file registry 114 and may generate a layer layout for the multi-layer file in file registry 114.

In step 208, layer management module 110 marks a new layer as being platform-independent in file registry 114 in response that the new layer is platform-independent. If the new layer is platform-independent, layer management module 110 may need to generate only one layer for all platforms 106. In step 210, layer management module 110 pushes the new layer into file registry 114 for one of platforms 106. Layer management module 110 may only need to push the new layer onto one of platforms 106. Layer management module 110 may just record the layer as platform-independent. When a multi-layer file is pushed into file registry 114, file registry 114 may analyze the file and generate the layer layout information which is recorded in file registry 114.

In step 212, layer management module 110 distributes one or more corresponding files through file registry 114 per a client request to access file system 104. The client request may include client information, e.g., operating system, platform, and other related information. The one or more corresponding files may include container images. File registry 114 may be responsible to distribute an appropriate layer to a client based on client information (e.g., operating system, platform and so on). A multiple-layers file may include both platform-independent layers and platform-dependent layers. Layer management module 110 may enable file registry 114 to distribute an appropriate layer to a client (e.g., a container image) based on client information (e.g., operating system, platform) for a platform-dependent or independent layer. When a user sends a file request, file registry 114 may distribute a corresponding layer to the user. For example, if the new generated layers of a multiple layer file are platform-independent, layer management module 110 only needs to build once for one platform 106 and the file can work well for multiple platforms 106 automatically. Time and space can be saved as platform-independent layers are shared.

FIGS. 3-7 illustrate exemplary functional diagrams of layer management module 110, in accordance with an embodiment of the present disclosure.

Figure 3:
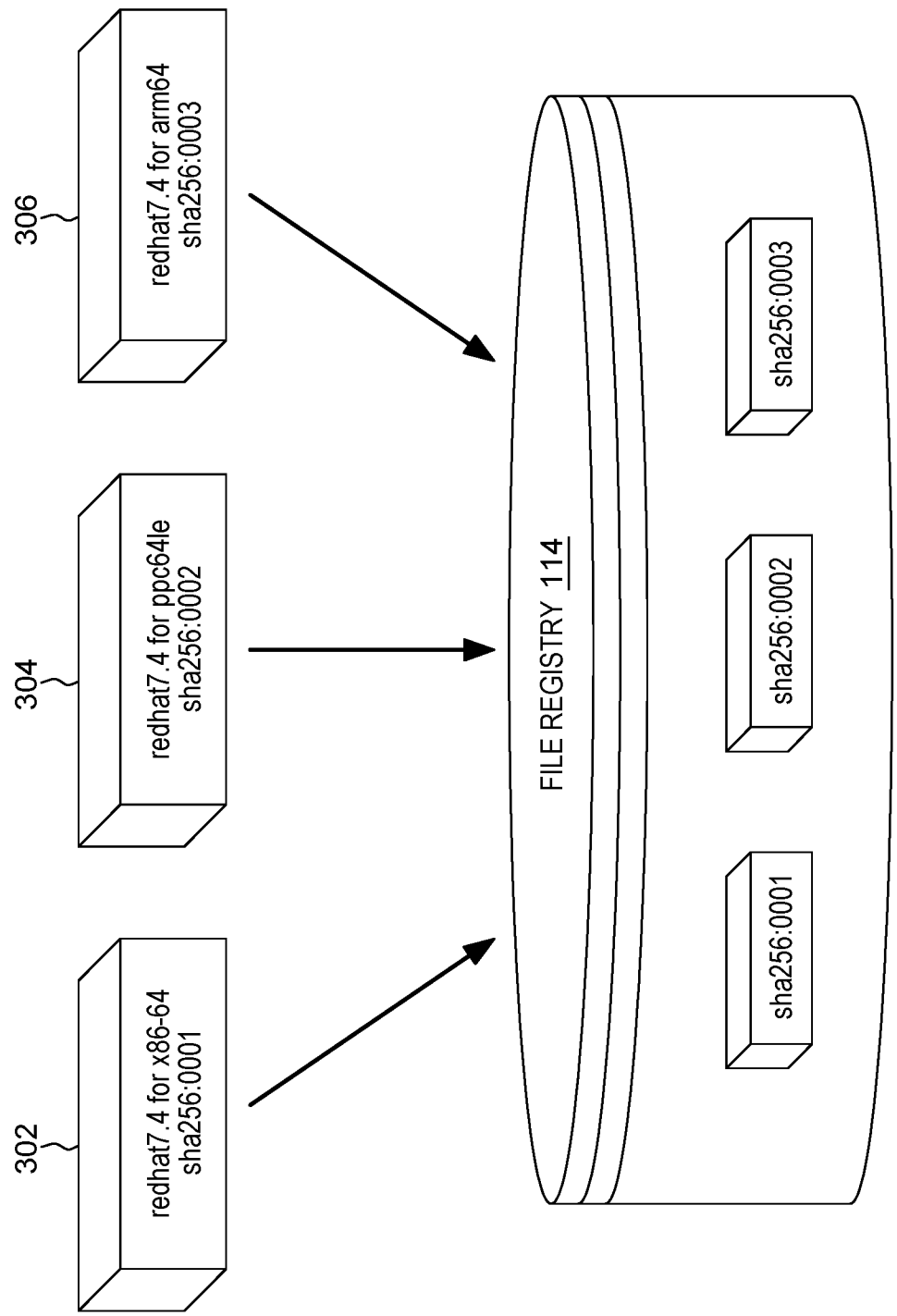
FIGS. 3-7 illustrate exemplary functional diagrams of the layer management module within the computing device of FIG. 1, in accordance with an embodiment of the present disclosure.
Figure 4:
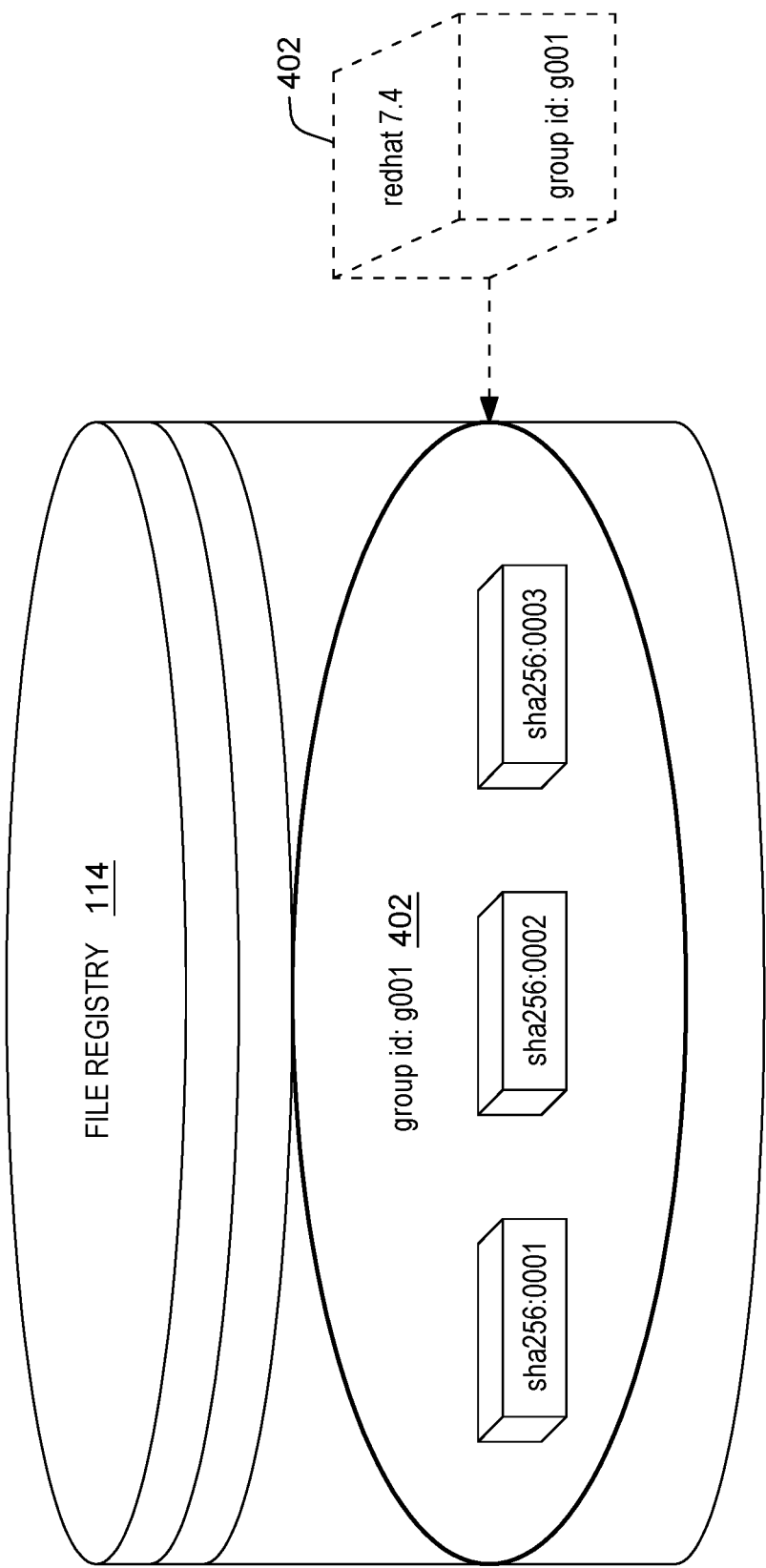
Figure 5:
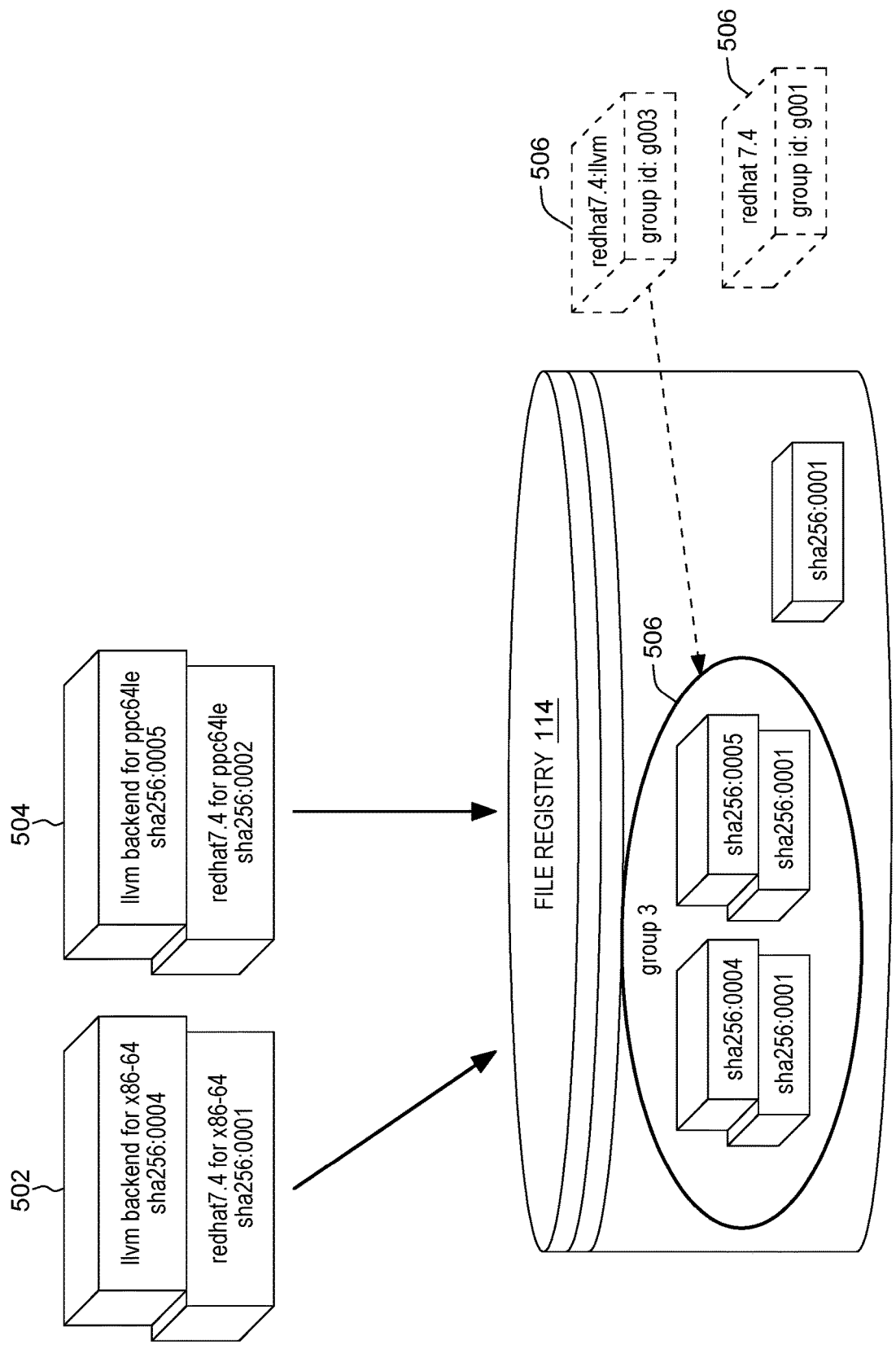
Figure 6:
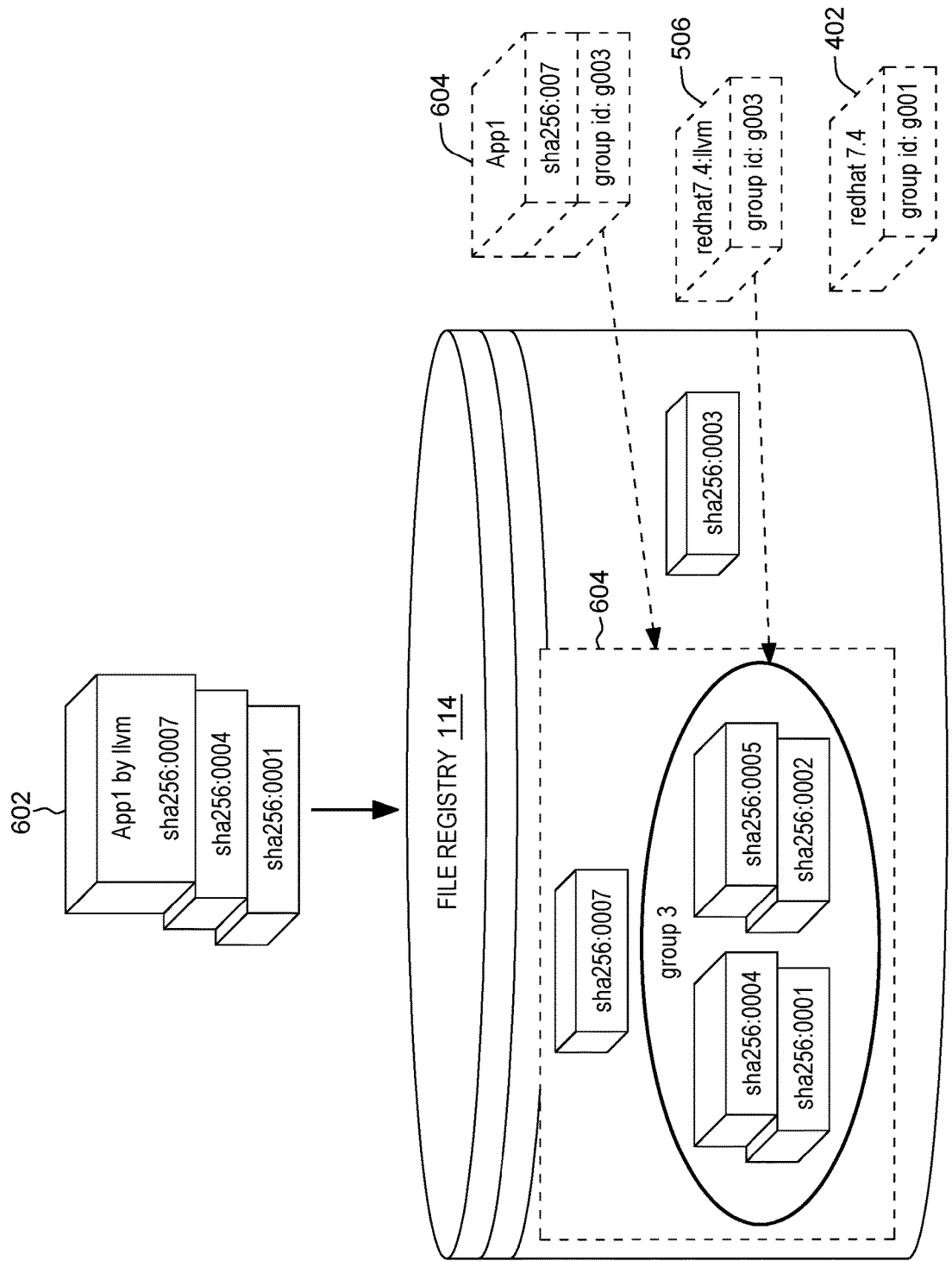
Figure 7:
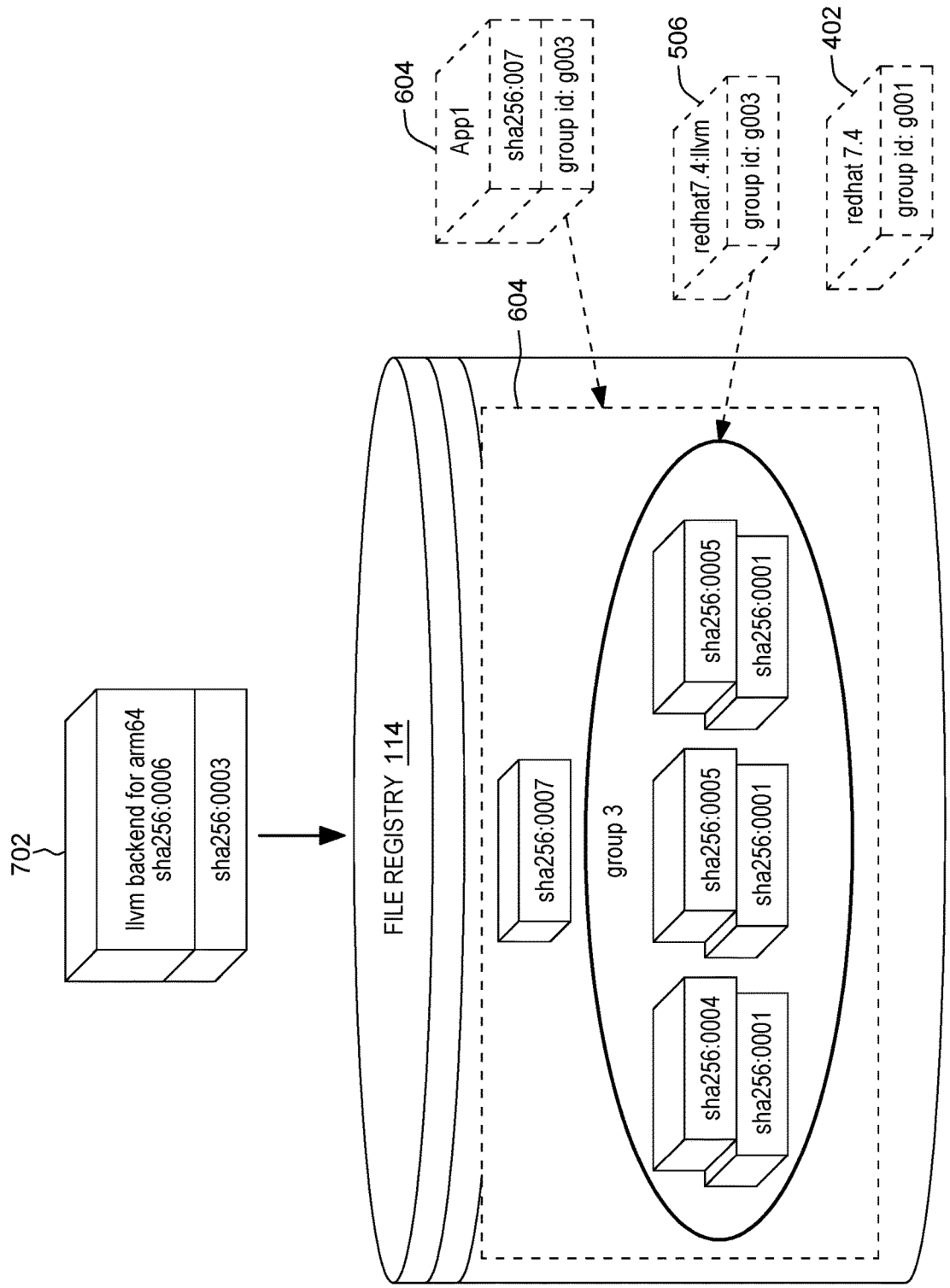

In the example of FIG. 3, layer management module 110 may generate an initial layer of file system 104. The initial layer may be a platform-dependent base layer, for example, base layer 116, e.g., 302, 304, 306, for a plurality of platforms 106. In the example, base layer 116 can include an operating system (e.g., redhat7.4) which is a platform-dependent file, for x86-64 302, ppc641e 304, and arm64 306. In the example, layer management module 110 may push redhat7.4 for x86-64 302, ppc641e 304, and arm64 306 into file registry 114. As shown in the example of FIG. 4, layer management module 110 may group redhat7.4 for x86-64 302, ppc641e 304, and arm64 306 as group 402 with a same group identification (e.g., g001) in file registry 114. In the example of FIG. 5, layer management module 110 may builds files (e.g., llvm backend) 502, 504 for x86-64 and ppc641e based on redhat 7.4. Layer management module 110 may assign the files (e.g., llvm backend) 502, 504 associated with the initial layer with a group identification (e.g., g003) as the same group 506 in file registry 114 for a plurality of platforms 106, e.g., x86-64 302, ppc641e. Example file redhat7.4:llvm 506 may have only one layer g003 in file registry 114. In the examples of FIGS. 6-7, layer management module 110 may deliver a file (e.g., app1 by llvm 602), which is platform-independent. Layer management module 110 may build the file (e.g., app1 by llvm 602) based on redhat7.4:llvm on x86-64, and may then push redhat7.4:llvm into file registry 114. The example file app1 602 can work on both x86-64 and ppc641e as in same group g003 604. In another example, layer management module 110 may build example llvm backend file 702 on arm64 based on redhat 7.4. Layer management module 110 may push example llvm backend file 702 into file registry 114. Layer management module 110 may add example llvm backend file 702 into group g003 604. Example app1 602 can then work on arm64.

Figure 8:
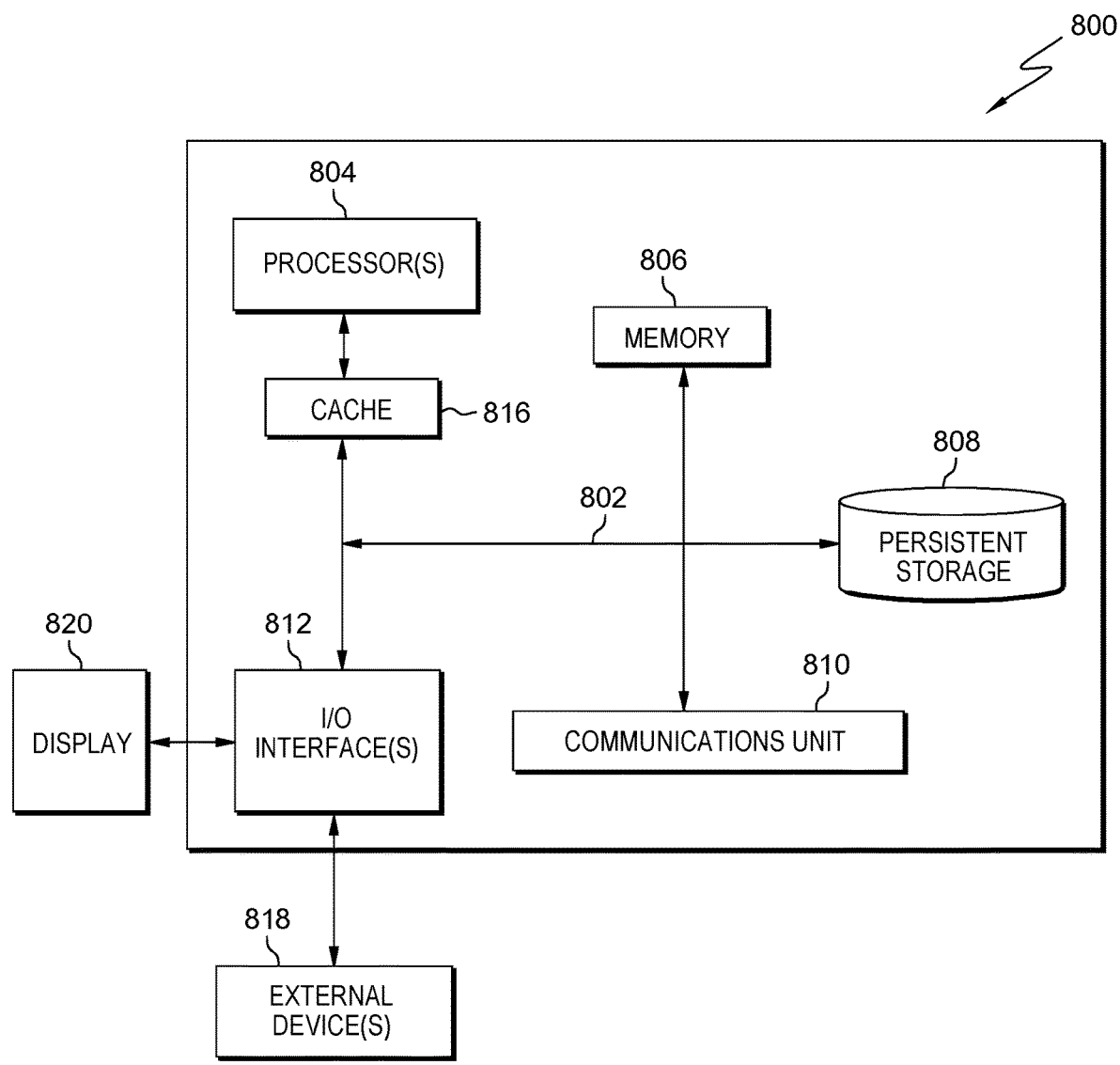
FIG. 8 is a block diagram of components of the computing device of FIG. 1, in accordance with an embodiment of the present disclosure.

FIG. 8 depicts a block diagram 800 of components of computing device 102 in accordance with an illustrative embodiment of the present disclosure. It should be appreciated that FIG. 8 provides only an illustration of one implementation and does not imply any limitations with regard to the environments in which different embodiments may be implemented. Many modifications to the depicted environment may be made.

Computing device 102 may include communications fabric 802, which provides communications between cache 816, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses or a crossbar switch.

Memory 806 and persistent storage 808 are computer readable storage media. In this embodiment, memory 806 includes random access memory (RAM). In general, memory 806 can include any suitable volatile or non-volatile computer readable storage media. Cache 816 is a fast memory that enhances the performance of computer processor(s) 804 by holding recently accessed data, and data near accessed data, from memory 806.

Layer management module 110 may be stored in persistent storage 808 and in memory 806 for execution by one or more of the respective computer processors 804 via cache 816. In an embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 810, in these examples, provides for communications with other data processing systems or devices. In these examples, communications unit 810 includes one or more network interface cards. Communications unit 810 may provide communications through the use of either or both physical and wireless communications links. Layer management module 110 may be downloaded to persistent storage 808 through communications unit 810.

I/O interface(s) 812 allows for input and output of data with other devices that may be connected to computing device 102. For example, I/O interface 812 may provide a connection to external devices 818 such as a keyboard, keypad, a touch screen, and/or some other suitable input device. External devices 818 can also include portable computer readable storage media such as, for example, thumb drives, portable optical or magnetic disks, and memory cards. Software and data used to practice embodiments of the present invention, e.g., layer management module 110 can be stored on such portable computer readable storage media and can be loaded onto persistent storage 808 via I/O interface(s) 812. I/O interface(s) 812 also connect to display 820.

Display 820 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
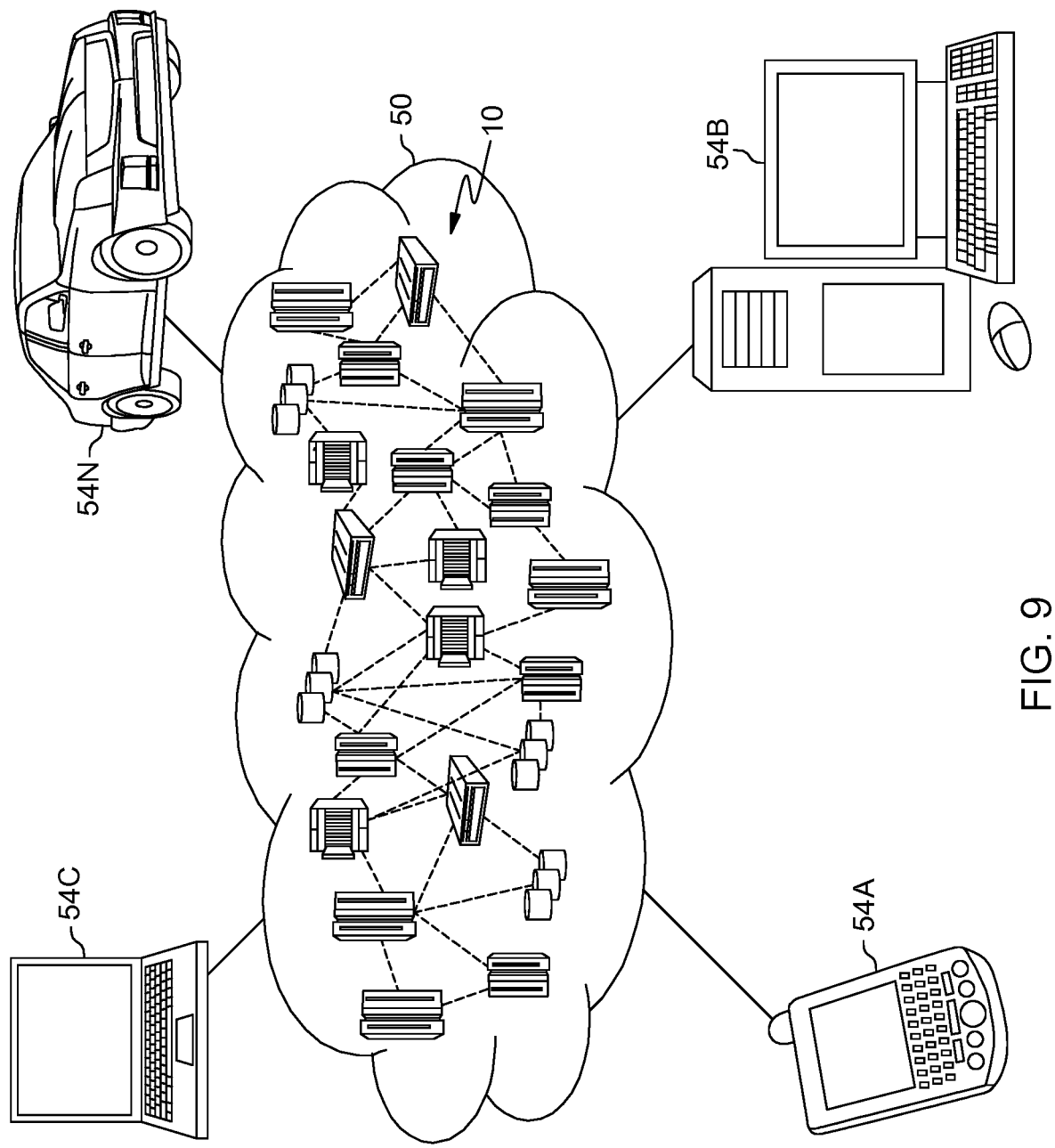
FIG. 9 depicts an embodiment of a cloud computing environment in accordance with the present disclosure.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
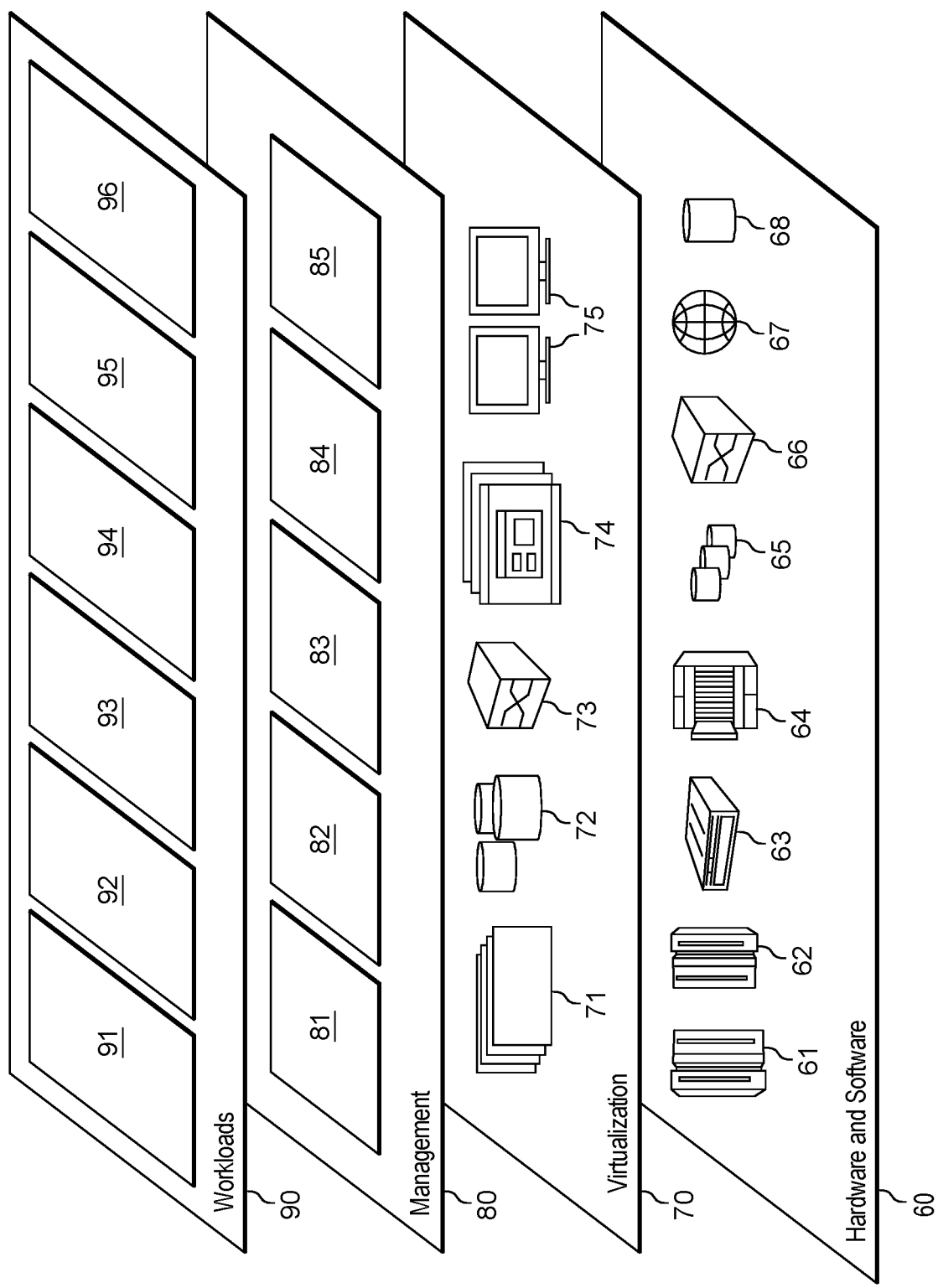
FIG. 10 depicts an embodiment of abstraction model layers of a cloud computing environment, in accordance with the present disclosure.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and module 96 including, for example, layer management module 110 as described above with respect to file layer classification and storage environment 100.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
generating, by one or more processors, an initial layer of a file system, the initial layer being a platform-dependent base layer;
assigning, by one or more processors, one or more files associated with the initial layer with a first group identification as a first same group in a file registry for a plurality of platforms;
generating, by one or more processors, a new layer based on the initial layer into the file system;
in response to the new layer being platform-independent, marking, by one or more processors, the new layer as platform-independent in the file registry;
pushing, by one or more processors, the new layer into the file registry for one of the plurality of platforms; and
distributing, by one or more processors, one or more corresponding files from the file registry per a client request to access the file system.

2. The computer-implemented method of claim 1, further comprising:
in response to the new layer being platform-dependent, generating, by one or more processors, a corresponding layer, based on the new layer, for each of the plurality of platforms; and
grouping, by one or more processors, each corresponding layer with a second group identification as a second same group.

3. The computer-implemented method of claim 1, further comprising:
classifying and storing multiple layers of the file system as platform-dependent and platform-independent.

4. The computer-implemented method of claim 1, further comprising:
enabling the file registry to record all counterparts of the initial layer for the plurality of platforms of platform-independent and platform-dependent layers in the form of a group, wherein each platform-independent and platform-dependent layer in the registry includes a platform-dependent/independent layer identification and a group layer identification.

5. The computer-implemented method of claim 1, further comprising:
pushing the files associated with the initial layer into the file registry; and
maintaining the files with a same tag in the file registry.

6. The computer-implemented method of claim 1, wherein the client request includes client information selected from the group consisting of: operating system and platform.

7. The computer-implemented method of claim 1, wherein the one or more corresponding files are container images.

8. A computer program product comprising:
one or more computer readable storage media, and program instructions collectively stored on the one or more computer readable storage media, the program instructions comprising:
program instructions to generate an initial layer of a file system, the initial layer being a platform-dependent base layer;
program instructions to assign one or more files associated with the initial layer with a first group identification as a first same group in a file registry for a plurality of platforms;
program instructions to generate a new layer based on the initial layer into the file system;

program instructions to, in response to the new layer being platform-independent, marking the new layer as platform-independent in the file registry;

program instructions to push the new layer into the file registry for one of the plurality of platforms; and program instructions to distribute one or more corresponding files from the file registry per a client request to access the file system.

9. The computer program product of claim 8, further comprising:

program instructions to, in response to the new layer being platform-dependent, generate a corresponding layer, based on the new layer, for each of the plurality of platforms; and program instructions to group each corresponding layer with a second group identification as a second same group.

10. The computer program product of claim 8, further comprising:

program instructions to classify and store multiple layers of the file system as platform-dependent and platform-independent.

11. The computer program product of claim 8, further comprising:

program instructions to enable the file registry to record all counterparts of the initial layer for the plurality of platforms of platform-independent and platform-dependent layers in the form of a group, wherein each platform-independent and platform-dependent layer in the registry includes a platform-dependent/independent layer identification and a group layer identification.

12. The computer program product of claim 8, further comprising:

program instructions to push the files associated with the initial layer into the file registry; and program instructions to maintain the files with a same tag in the file registry.

13. The computer program product of claim 8, wherein the client request includes client information selected from the group consisting of: operating system and platform.

14. The computer program product of claim 8, wherein the one or more corresponding files are container images.

15. A computer system comprising:

one or more computer processors, one or more computer readable storage media, and program instructions stored on the one or more computer readable storage media for execution by at least one of the one or more computer processors, the program instructions comprising:

program instructions to generate an initial layer of a file system, the initial layer being a platform-dependent base layer;

program instructions to assign one or more files associated with the initial layer with a first group identification as a first same group in a file registry for a plurality of platforms;

program instructions to generate a new layer based on the initial layer into the file system;

program instructions to, in response to the new layer being platform-independent, marking the new layer as platform-independent in the file registry;

program instructions to push the new layer into the file registry for one of the plurality of platforms; and program instructions to distribute one or more corresponding files from the file registry per a client request to access the file system.

16. The computer system of claim 15, further comprising:

program instructions to, in response to the new layer being platform-dependent, generate a corresponding layer, based on the new layer, for each of the plurality of platforms; and program instructions to group each corresponding layer with a second group identification as a second same group.

17. The computer system of claim 15, further comprising:

program instructions to classify and store multiple layers of the file system as platform-dependent and platform-independent.

18. The computer system of claim 15, further comprising:

program instructions to enable the file registry to record all counterparts of the initial layer for the plurality of platforms of platform-independent and platform-dependent layers in the form of a group, wherein each platform-independent and platform-dependent layer in the registry includes a platform-dependent/independent layer identification and a group layer identification.

19. The computer system of claim 15, further comprising:

program instructions to push the files associated with the initial layer into the file registry; and program instructions to maintain the files with a same tag in the file registry.

20. The computer system of claim 15, wherein the client request includes client information selected from the group consisting of: operating system and platform.

* * * * *